(12) United States Patent
Youssef et al.

(10) Patent No.: US 11,573,245 B2
(45) Date of Patent: Feb. 7, 2023

(54) METHOD AND SYSTEM FOR AUTOMATIC FACTORY CALIBRATION

(71) Applicant: InvenSense, Inc., San Jose, CA (US)

(72) Inventors: Joe Youssef, Sant Egreve (FR); Karthik Katingari, San Jose, CA (US); Sebastian Riccardi, Brezins (FR); Hemabh Shekhar, Los Gatos, CA (US)

( * ) Notice: Subject to any disclaimer, the term of this patent is extended or adjusted under 35 U.S.C. 154(b) by 349 days.

(21) Appl. No.: 16/212,032

(22) Filed: Dec. 6, 2018

(65) Prior Publication Data

US 2019/0170546 A1 Jun. 6, 2019

Related U.S. Application Data

(60) Provisional application No. 62/595,562, filed on Dec. 6, 2017.

(51) Int. Cl.
| | |
|---|---|
| *G06F 3/01* | (2006.01) |
| *G01D 18/00* | (2006.01) |
| *G01P 13/00* | (2006.01) |
| *G01S 11/14* | (2006.01) |
| *G01S 11/12* | (2006.01) |
| *G01S 11/16* | (2006.01) |
| *G06F 3/038* | (2013.01) |
| *G06F 3/033* | (2013.01) |
| *G01C 21/16* | (2006.01) |
| *G06F 3/0346* | (2013.01) |
| *G01S 5/18* | (2006.01) |

(52) U.S. Cl.
CPC ............ *G01P 13/00* (2013.01); *G01C 21/165* (2013.01); *G01D 18/00* (2013.01); *G01S 5/18* (2013.01); *G01S 11/12* (2013.01); *G01S 11/14* (2013.01); *G01S 11/16* (2013.01); *G06F 3/017* (2013.01); *G06F 3/033* (2013.01); *G06F 3/038* (2013.01); *G06F 3/0346* (2013.01)

(58) Field of Classification Search
CPC ....... G01C 21/165; G01D 18/00; G01P 13/00; G01S 11/12; G01S 11/14; G01S 11/16; G01S 5/18; G06F 3/017; G06F 3/033; G06F 3/0346; G06F 3/038
See application file for complete search history.

(56) References Cited

U.S. PATENT DOCUMENTS

| | | | |
|---|---|---|---|
| 2014/0352400 A1* | 12/2014 | Barrilado | G01P 15/0802 73/1.38 |
| 2015/0149956 A1* | 5/2015 | Kempinski | G06F 3/013 715/784 |
| 2018/0120134 A1* | 5/2018 | Deilmann | G01D 21/00 |

* cited by examiner

*Primary Examiner* — Roy Y Yi
*Assistant Examiner* — Geoffrey T Evans (57) ABSTRACT

A sensor may be automatically calibrated during manufacture by providing a sensor processing unit having an integrated sensor, performing a check to determine if the integrated sensor has been previously calibrated upon a reset. When it has been determined the integrated sensor has not been previously calibrated, an automated calibration pattern may be imparted to the sensor so that a calibration parameter is determined.

20 Claims, 3 Drawing Sheets

METHOD AND SYSTEM FOR AUTOMATIC FACTORY CALIBRATION

CROSS REFERENCE TO RELATED APPLICATIONS

This application claims priority from and benefit of U.S. Provisional Patent Application Ser. No. 62/595,562, filed Dec. 6, 2017, which is entitled "System for determining position and orientation of a mobile device in 6 degrees of freedom," which is assigned to the assignee hereof and is incorporated by reference in its entirety.

FIELD OF THE PRESENT DISCLOSURE

This disclosure generally relates to motion sensors and more specifically to the calibration of a portable device during manufacture.

BACKGROUND

The development of microelectromechanical systems (MEMS) has enabled the incorporation of a wide variety of sensors into mobile devices, such as cell phones, laptops, tablets, gaming devices and other portable, electronic devices. Non-limiting examples of such sensors include an accelerometer, a gyroscope, a magnetometer, a pressure sensor, an ultrasonic sensor, a microphone, a proximity sensor, an ambient light sensor, an infrared sensor, and the like. Further, sensor fusion processing may be performed to combine the data from a plurality of sensors to provide an improved characterization of the device's motion or orientation. However, due to the nature of electronics and mechanics, MEMS-based sensors may be prone to having bias (offset) and sensitivity errors. These errors may drift and or change due to temperature, humidity, time, assembly stress and other changes in peripheral conditions. In turn, inaccurate bias may result in decreased quality of sensor data and may complicate the sensor fusion process used to estimate parameters such as attitude (e.g., pitch, roll, and yaw), heading reference and the like which are dependent on the precision of the sensors' outputs. For example, when integration of raw data output by the sensor is used to determine velocity from acceleration or orientation angle from the rate of angular change, the bias drift problem may be significantly magnified. While the following discussion is in the context of MEMS sensors as used in portable devices, one of skill in the art will recognize that these techniques may be employed to any suitable sensor application as desired.

In light of these characteristics of MEMS sensors, it may be desirable to perform a sensor calibration operation to characterize the bias or sensitivity error as well as other parameters as desired, enabling a correction of the sensor data. A sensor calibration operation may employ mathematical calculations to deduce various motion states and the position or orientation of a physical system. A sensor bias may be produced by the calibration operation, which may then be applied to the raw sensor data and calibrate the sensor. As will be appreciated, the calibration operation may be performed at various stages during manufacture or may be performed periodically while the device is being used to account for changes that may occur over time. In particular, even though some calibration aspects may be performed on the sensor itself after it is fabricated, the integration of the sensor into a chip and the subsequent incorporation of the chip into a portable device fundamentally changes the environmental conditions to which the sensor is exposed, necessitating a calibration operation to improve the quality of data obtained from the sensor. Indeed, it will be appreciated that the production of a finished device that is ready for use represents a desirable stage for sensor calibration, since the environmental conditions attributable to the device and its other components will then be fixed with respect to the sensor.

Accordingly, this disclosure is directed to systems and methods for performing a calibration operation for a sensor during device manufacture. Conventional manufacturing techniques typically involve establishing a wired communication with the circuitry of the device once production is finished to carry out the calibration operation, as well as coordinating the start of the calibration. Although effective, such techniques are labor-intensive and require separately connecting and disconnecting the device in order to perform the calibration, adding time to the overall manufacturing process. In light of the above, it would be desirable to increase the efficiency and reliability of calibration. To address these needs and others, this disclosure is directed to techniques for performing an automatic calibration operation during manufacture that as described in the materials below.

SUMMARY

As will be described in detail below, this disclosure includes a method for automatically calibrating a sensor. The method may involve providing a sensor processing unit having an integrated sensor, performing a check to determine if the integrated sensor has been previously calibrated upon a reset, monitoring for a machine-induced, automated calibration pattern when the integrated sensor has not been previously calibrated, imparting at least one automated calibration pattern to the sensor processing unit when the integrated sensor has not been previously calibrated and determining a calibration parameter for the integrated sensor based at least in part on the imparted automated calibration pattern when the integrated sensor has not been previously calibrated.

This disclosure also includes a portable device having an integrated sensor and a calibration module. The calibration module may be configured to perform a check to determine if the integrated sensor has been previously calibrated upon a reset of the portable device, monitor for a machine-induced, automated calibration pattern when the integrated sensor has not been previously calibrated and determine a calibration parameter for the integrated sensor based at least in part on experiencing the automated calibration pattern when the integrated sensor has not been previously calibrated.

DETAILED DESCRIPTION

At the outset, it is to be understood that this disclosure is not limited to particularly exemplified materials, architectures, routines, methods or structures as such may vary. Thus, although a number of such options, similar or equivalent to those described herein, can be used in the practice or embodiments of this disclosure, the preferred materials and methods are described herein.

It is also to be understood that the terminology used herein is for the purpose of describing particular embodiments of this disclosure only and is not intended to be limiting.

The detailed description set forth below in connection with the appended drawings is intended as a description of exemplary embodiments of the present disclosure and is not intended to represent the only exemplary embodiments in which the present disclosure can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the specification. It will be apparent to those skilled in the art that the exemplary embodiments of the specification may be practiced without these specific details. In some instances, well known structures and devices are shown in block diagram form in order to avoid obscuring the novelty of the exemplary embodiments presented herein.

For purposes of convenience and clarity only, directional terms, such as top, bottom, left, right, up, down, over, above, below, beneath, rear, back, and front, may be used with respect to the accompanying drawings or chip embodiments. These and similar directional terms should not be construed to limit the scope of the disclosure in any manner.

In this specification and in the claims, it will be understood that when an element is referred to as being "connected to" or "coupled to" another element, it can be directly connected or coupled to the other element or intervening elements may be present. In contrast, when an element is referred to as being "directly connected to" or "directly coupled to" another element, there are no intervening elements present.

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the exemplary wireless communications devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor. For example, a carrier wave may be employed to carry computer-readable electronic data such as those used in transmitting and receiving electronic mail or in accessing a network such as the Internet or a local area network (LAN). Of course, many modifications may be made to this configuration without departing from the scope or spirit of the claimed subject matter.

The various illustrative logical blocks, modules, circuits and instructions described in connection with the embodiments disclosed herein may be executed by one or more processors, such as one or more sensor processing units (SPUs), digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structure or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of a Motion Processor Unit (MPU) or Sensor Processing Unit (SPU) and a microprocessor, a plurality of microprocessors, one or more microprocessors in conjunction with an MPU/SPU core, or any other such configuration.

Unless defined otherwise, all technical and scientific terms used herein have the same meaning as commonly understood by one having ordinary skill in the art to which the disclosure pertains.

Finally, as used in this specification and the appended claims, the singular forms "a, "an" and "the" include plural referents unless the content clearly dictates otherwise.

Figure 1:
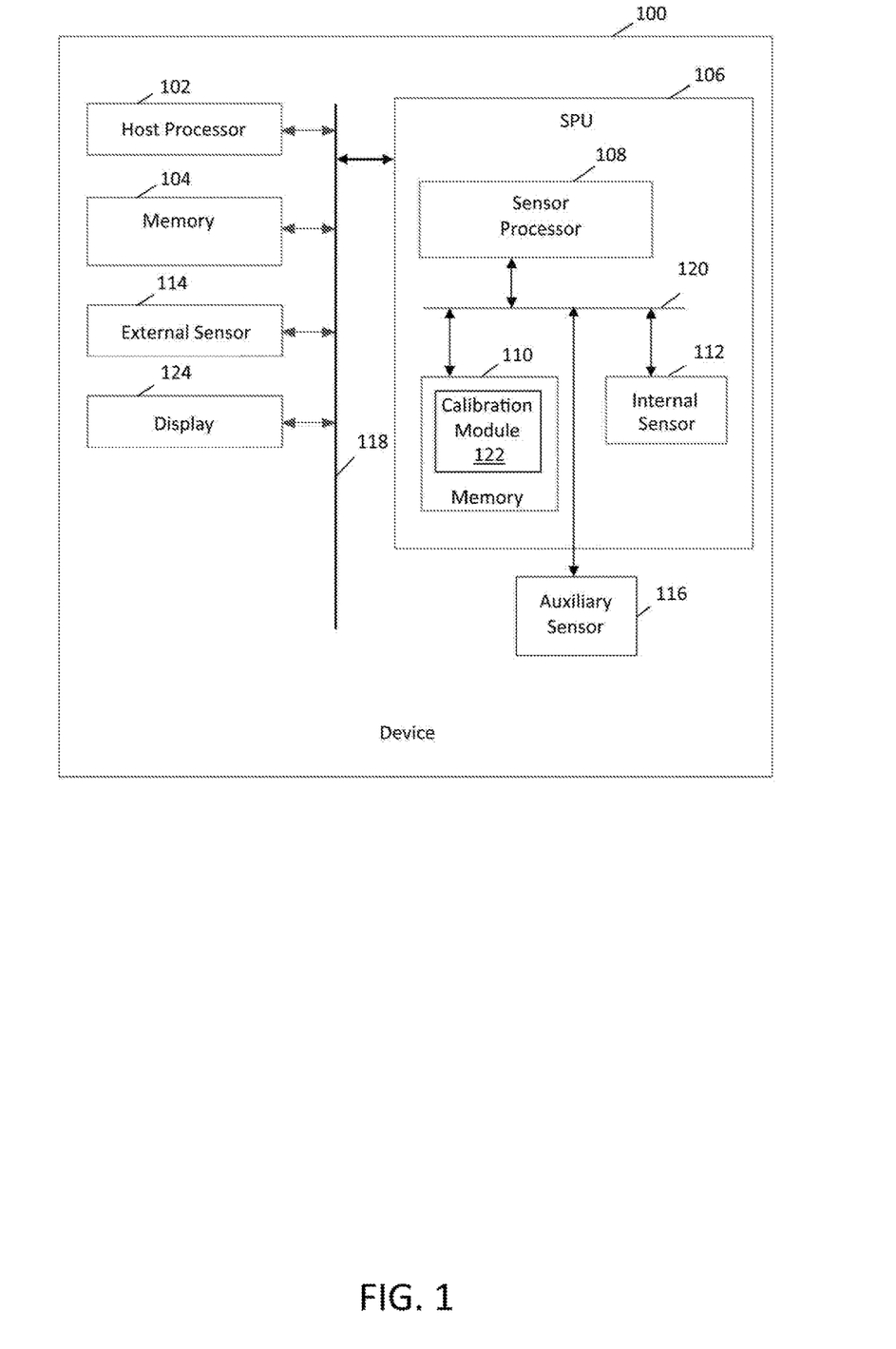
FIG. 1 is a schematic diagram of portable device having a sensor that may be automatically calibrated during manufacture, according to an embodiment.

Details regarding one embodiment of portable device 100 including features of this disclosure are depicted as high level schematic blocks in FIG. 1. As will be appreciated, device 100 may be implemented as a portable device or apparatus that can be moved in space by a user and its motion and/or orientation in space therefore sensed. Common examples include a mobile phone (e.g., cellular phone, a phone running on a local network, or any other telephone handset), wired telephone (e.g., a phone attached by a wire), personal digital assistant (PDA), video game player, video game controller, navigation device, activity or fitness tracker device (e.g., bracelet or clip), smart watch, other wearable device, mobile internet device (MID), personal navigation device (PND), digital still camera, digital video camera, binoculars, telephoto lens, portable music, video, or media player, remote control, or other handheld device, or a combination of one or more of these devices.

As shown, device 100 includes a host processor 102, which may be one or more microprocessors, central processing units (CPUs), or other processors to run software programs, which may be stored in memory 104, associated with the functions of device 100. Multiple layers of software can be provided in memory 104, which may be any combination of computer readable medium such as electronic memory or other storage medium such as hard disk, optical disk, etc., for use with the host processor 102. For example, an operating system layer can be provided for device 100 to control and manage system resources in real time, enable functions of application software and other layers, and interface application programs with other software and functions of device 100. Similarly, different software application programs such as menu navigation software, games, camera function control, navigation software, communications software, such as telephony or wireless local area network (WLAN) software, or any of a wide variety of other software and functional interfaces can be provided. In some embodiments, multiple different applications can be provided on a single device 100, and in some of those embodiments, multiple applications can run simultaneously.

Device 100 includes at least one sensor assembly, as shown here in the form of integrated sensor processing unit (SPU) 106 featuring sensor processor 108, memory 110 and internal sensor 112. Memory 110 may store algorithms, routines or other instructions for processing data output by internal sensor 112 and/or other sensors as described below using logic or controllers of sensor processor 108, as well as storing raw data and/or motion data output by internal sensor 112 or other sensors. Memory 110 may also be used for any of the functions associated with memory 104. Internal sensor 112 may be one or more sensors for measuring motion of device 100 in space, such as an accelerometer, a gyroscope, a magnetometer, a pressure sensor or others. Depending on the configuration, SPU 106 measures one or more axes of rotation and/or one or more axes of acceleration of the device. In one embodiment, internal sensor 112 may include rotational motion sensors or linear motion sensors. For example, the rotational motion sensors may be gyroscopes to measure angular velocity along one or more orthogonal axes and the linear motion sensors may be accelerometers to measure linear acceleration along one or more orthogonal axes. In one aspect, three gyroscopes and three accelerometers may be employed, such that a sensor fusion operation performed by sensor processor 108, or other processing resources of device 100, combines data from internal sensor 112 to provide a six axis determination of motion or six degrees of freedom (6DOF). As desired, internal sensor 112 may be implemented using Micro Electro Mechanical System (MEMS) to be integrated with SPU 106 in a single package. Exemplary details regarding suitable configurations of host processor 102 and SPU 106 may be found in, commonly owned U.S. Pat. No. 8,250,921, issued Aug. 28, 2012, and U.S. Pat. No. 8,952,832, issued Feb. 10, 2015, which are hereby incorporated by reference in their entirety. Suitable implementations for SPU 106 in device 100 are available from InvenSense, Inc. of San Jose, Calif.

Alternatively or in addition, device 100 may implement a sensor assembly in the form of external sensor 114. This is optional and not required in all embodiments. External sensor may represent one or more sensors as described above, such as an accelerometer and/or a gyroscope. As used herein, "external" means a sensor that is not integrated with SPU 106 and may be remote or local to device 100. Also alternatively or in addition, SPU 106 may receive data from an auxiliary sensor 116 configured to measure one or more aspects about the environment surrounding device 100. This is optional and not required in all embodiments. For example, a pressure sensor and/or a magnetometer may be used to refine motion determinations made using internal sensor 112. In one embodiment, auxiliary sensor 116 may include a magnetometer measuring along three orthogonal axes and output data to be fused with the gyroscope and accelerometer inertial sensor data to provide a nine axis determination of motion. In another embodiment, auxiliary sensor 116 may also include a pressure sensor to provide an altitude determination that may be fused with the other sensor data to provide a ten axis determination of motion. Although described in the context of one or more sensors being MEMS based, the techniques of this disclosure may be applied to any sensor design or implementation.

In the embodiment shown, host processor 102, memory 104, SPU 106 and other components of device 100 may be coupled through bus 118, while sensor processor 108, memory 110, internal sensor 112 and/or auxiliary sensor 116 may be coupled though bus 120, either of which may be any suitable bus or interface, such as a peripheral component interconnect express (PCIe) bus, a universal serial bus (USB), a universal asynchronous receiver/transmitter (UART) serial bus, a suitable advanced microcontroller bus architecture (AMBA) interface, an Inter-Integrated Circuit (I2C) bus, a serial digital input output (SDIO) bus, a serial peripheral interface (SPI) or other equivalent. Depending on the architecture, different bus configurations may be employed as desired. For example, additional buses may be used to couple the various components of device 100, such as by using a dedicated bus between host processor 102 and memory 104.

Code, algorithms, routines or other instructions for processing sensor data may be employed by calibration module 122, schematically represented in this figure as being stored in memory 110 for execution by sensor processor 108, to perform any of the operations associated with the techniques of this disclosure. Correspondingly, calibration module 122 may be configured to determine whether the sensor has been previously calibrated following device manufacture and if not, monitor for an automated calibration pattern and determine calibration parameters upon experiencing the automated calibration pattern, as discussed in further detail below. The automated calibration operation may be configured to determine a bias, a sensitivity factor, or both, which may be estimated with respect to any one or more sensors, including internal sensor 112, external sensor 114 and/or auxiliary sensor 116. The automated calibration process may be configured to determine any relevant calibration parameter or calibration matrix. For example, as well known by persons skilled in the art, a 3×3 calibration matrix for motion sensors may comprise a 3×3 calibration matrix for the sensitivity, misaligmnet and cross-axis, for the different axes of the motion sensor. In another example, a 3×1 calibration matrix may be determined for the offset/bias on the different axis. In yet another example of a calibration parameter, for a pressure sensor the sensitivity of the pressure sensor may be determined. As further illustrations, calibration of a pressure sensor may employ a complex model with different pressure/temperature points, calibration of temperature sensor may produce calibration parameters comprising set of coefficients fitting a model, such as a polynomial, and a microphone or ultrasound sensor could be calibrated at different beam angles. Further details regarding aspects of motion and environmental conditions that may be employed during calibration may be found in U.S. Patent Publication No. 2014/0368429 and U.S. Pat. No. 7,890,291, both of which are incorporated by reference in their entirety. Alternatively or in addition, the functionality of calibration module 122 may be implemented using host processor 102 and memory 104 or any other suitable processing resources. In this case, SPU 106 may transfer the sensor data acquired during calibration to host processor 102 and/or memory 104. Still further, the techniques of this disclosure can also be extended to different stages of the manufacturing process. For example, following integration of a sensor into a SPU, it may be desirable to perform an automated calibration operation before the SPU is then incorporated into portable device 100. Thus, in such embodiments, it may be desirable to implement calibration module 122 using sensor processor 108 and memory 110 as noted. Accordingly, the techniques of this disclosure can include calibrating an SPU alone or calibrating a finished device that incorporates the SPU. A key characteristic of the calibration procedure controlled by the calibration module is that is executed with a high precision, which can only be obtained through machine control, rather than manual human control.

As will be appreciated, the automated calibration pattern used may correspond to the type of sensor being calibrated. For example, calibration of an accelerometer may involve imparting defined accelerations along one or more axes, which may or may not be orthogonal, calibration of a gyroscope may involve imparting defined angular rotations about one or more axes, which may or may not be orthogonal, calibration of a magnetometer may involve imparting known magnetic fields in one or more axes, which may or may not be orthogonal, and calibration of a pressure sensor may involve imparting one or more known pressures. Similarly, calibration of other types of sensor may employ subjecting the sensor to suitable environmental variables as known to one of ordinary skill in the art. Non-limiting examples of other possible environmental conditions include temperature, pressure, ambient light, and proximity. Further, one or more characteristics of the automated calibration pattern may signify which type of sensor is to be calibrated. By detecting these characteristics, the appropriate calibration routine is then invoked for the corresponding sensor type.

Notably, the calibration pattern is automated, which according to this disclosure means that it is produced by a machine in a manner that cannot be replicated by a human user or as a result of random conditions. Therefore, any number of characteristics may be associated with the automated calibration pattern. As one non-limiting example, the automated calibration pattern may include repetition of conditions within a tolerance that cannot be provided by a human or randomly. Such conditions may be motion conditions, including motionlessness, or other suitable environmental conditions. The motion condition or motion pattern may be a translation or rotation along a predefined single axis, or a plurality of predefined axes. The motion condition or motion pattern may also be a series of poses in a predefined pattern. The motion condition may comprise a condition accurary, e.g. a motion accuracy, to detect and/or confirm that the condition is a machine controlled, machine-induced condition. The condition accuracy may be defined based on a variance of the condition, or the ratio of the variance and the noise, or any other measure of accuracy or stability of the condition. The condition accuracy may be applied to each of the axis of the sensor when multiple axes are present. For example, when calibrating a motion sensor like an accelerometer using a translation along a predefined axis, the signal from the accelerometer should be constant. The condition accuracy may be the variance of the acceleration, or the ratio of the variance of acceleration compared to the noise level of the accelerometer signal. If the variance, or ratio of variance and noise, is below an accury threshold, it may be determined that the motion is machine controlled motion. For example, the variance should be less than several times (e.g. 3×) the noise level. In a similar manner, when calibrating a gyroscope, the motion may comprise a rotation along a predefined axis, where the accuracy condition may be based on the variance of the gyroscope signal, i.e. the rotation speed. Thus, the condition accuracy may be compared to a threshold to determine if the condition is a machine controlled condition. Aspects of motion of the automatic calibration pattern may include single axis rotation, single axis translation or sine like rotation/translation, such that the involved motion is of sufficient precision to preclude the possibility of being performed by a human and must be induced by a machine. Similarly, one or more aspects of the pattern may be performed over a defined period of time to an accuracy that could not be met by a human or randomly. Further, the pattern may include any desired number of combinations of such factors as needed to ensure that the automatic calibration pattern is reliably identified and distinguishable from other environmental conditions. In some embodiments, the automated calibration pattern may also include a validation pattern, which may be the same or different, and is used to confirm any parameters determined for the sensor based on the automated calibration pattern. As desired, the validation pattern may include serval test points that are different from the automatic calibration pattern, such as different positions, motions, orientations, temperatures, pressures and the like as appropriate. An accuracy of the validation results may be determined, and may be used to decide the calibration was successful or not, or may be used to determine a calibration accuracy. In some embodiments, when the calibration did not obtain the desired level of accuracy, the calibration may be repeated, or it may be decided not to indicated that the calibration was previously performed, so that a second calibration may be performed on a next reset. In some embodiments, calibration module 122 may subsequently provide feedback or output. The feedback may comprise an obtained accuracy or a request for further calibration. As one option, calibration module 122, may control at least some part of the calibration procedure in order to obtain optimum results.

Accordingly, at least some aspects of the automated calibration pattern may involve motion of the portable device, which can include changes in relative location, distance and/or orientation of portable device 100. Determining the motion or orientation of portable device 100 may involve sensor fusion or similar operations performed by SPU processor 108. In other embodiments, some, or all, of the processing and calculation may be performed by the host processor 102, which may be using the host memory 104, or any combination of other processing resources. One or more additional internal sensors, such as internal sensor 112 may be integrated into SPU 102 as desired. If provided, external sensor 114, internal sensor 112, and/or auxiliary sensor 116 may include one or more sensors, such as accelerometers, gyroscopes, magnetometers, pressure sensors, ultrasound sensors, microphones, proximity, and ambient light sensors, and temperature sensors among other sensors. As used herein, an internal sensor refers to a sensor implemented using the MEMS techniques for integration with SPU 106 into a single chip. Similarly, an external sensor as used herein refers to a sensor carried on-board device 100 that is not integrated into SPU 106. An accelerometer, gyroscope and/or any other sensor used in the techniques of this disclosure may be implemented as an internal or external sensor as desired.

Figure 2:
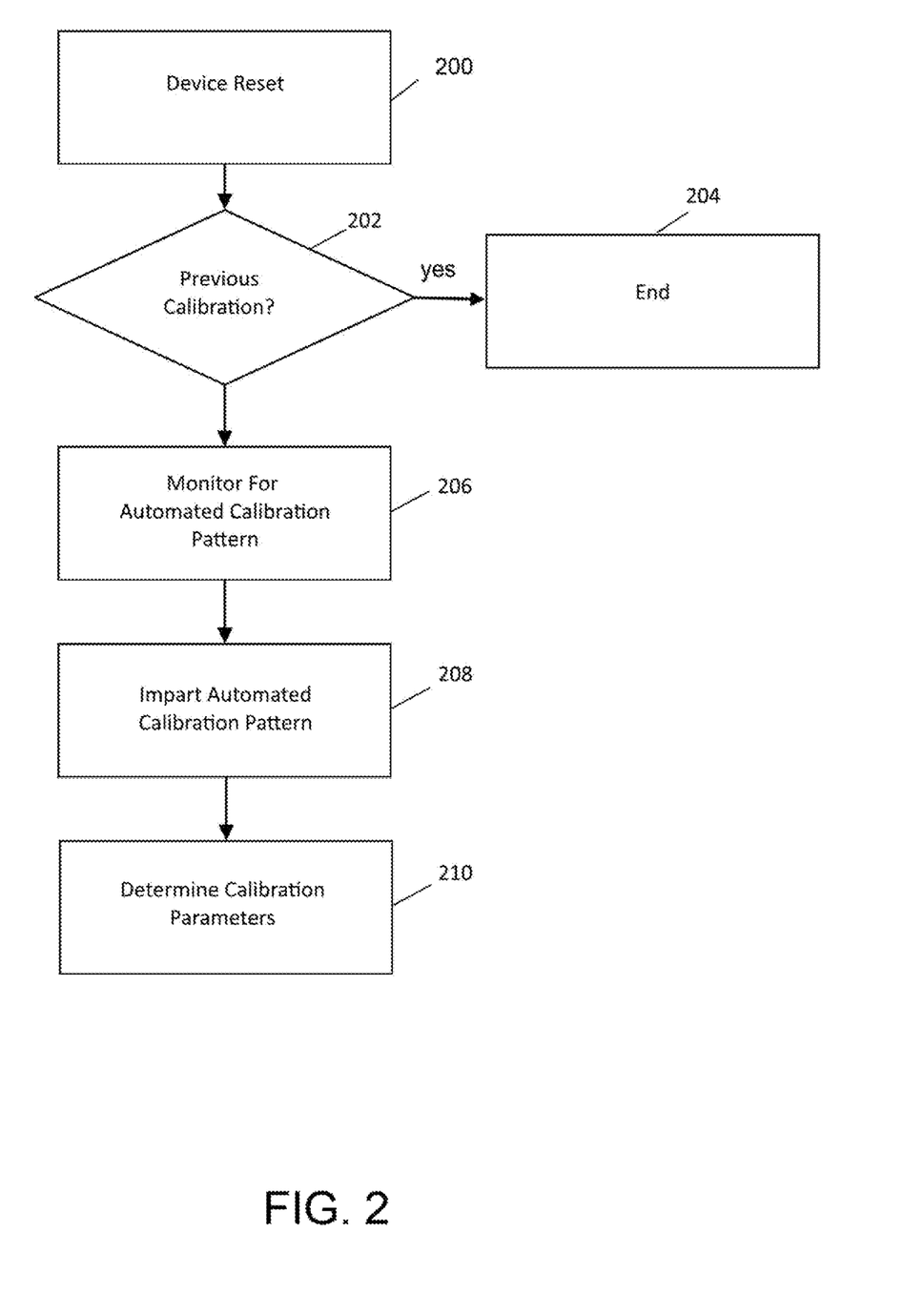
FIG. 2 is a routine for automatically factory calibrating a sensor, according to an embodiment.

To help explain aspects of this disclosure, a suitable calibration routine is schematically represented by the flow chart depicted in FIG. 2. Beginning with 200, a device having a sensor to be calibrated, such as portable device 100, may be powered on for the first time or otherwise experience a reset of either hardware, software or both. In 202, a check may be performed to determine whether the sensor has previously been calibrated. As compared to conventional techniques, no external communication is established, either by connecting wired cables or wirelessly. In some embodiments, this functionality may be implemented by calibration module 122. The check may be performed in any suitable manner. For example, a flag, register or other equivalent data structure may be used to indicate whether the sensor has previously been calibrated. In some embodiments, the existence of one or more non-zero calibration parameters for the sensor may provide the indication that the sensor has previously been canceled. If the sensor has been calibrated, the routine ends at 204 as indicated. Otherwise, in 206 calibration module 122 may monitor for an automated calibration pattern, such as described above. If production of portable device 100 has concluded, the automated calibration pattern may be imparted in 208. This involves subjecting portable device 100 to machine-induced conditions that cannot be replicated by a human or randomly. In some embodiments, the automated calibration pattern may include an initialization sequence followed by one or more sequences configured to facilitate the calibration of the sensor. For example, the initialization sequence could be configured for easier recognition, could be shorter or could otherwise differ from the aspects actually used for calibration. Alternatively, the same sequence or group of sequences may be used for both initialization and calibration. Based at least in part on the automated calibration pattern imparted in 208, calibration module 122 then determines one or more calibration parameters for the sensor in 210. These parameters may be stored so they can be applied to subsequent sensor readings, and depending on the embodiment, a flag may be set, or a value stored in a register to signify that calibration has been performed to that in subsequent iterations, the routine will branch to 204 and terminate as indicated above. If desirable for economy of processing resources or any other reason, any or all aspects of this routine following the calibration check in 202 may be deleted from calibration module 122. As will be appreciated, the techniques of this disclosure do not involve or require any external communication, whether wired or wirelessly, and may be applied directly to a sensor integrated into a sensor processing unit or to a sensor that has been incorporated into a device for which manufacture has been completed. In addition, the calibration can also be validated, either by using a validation pattern as discussed above or by using the automatic calibration pattern and checking for residual error in comparison to expected values or a model over a given number of iterations.

Figure 3:
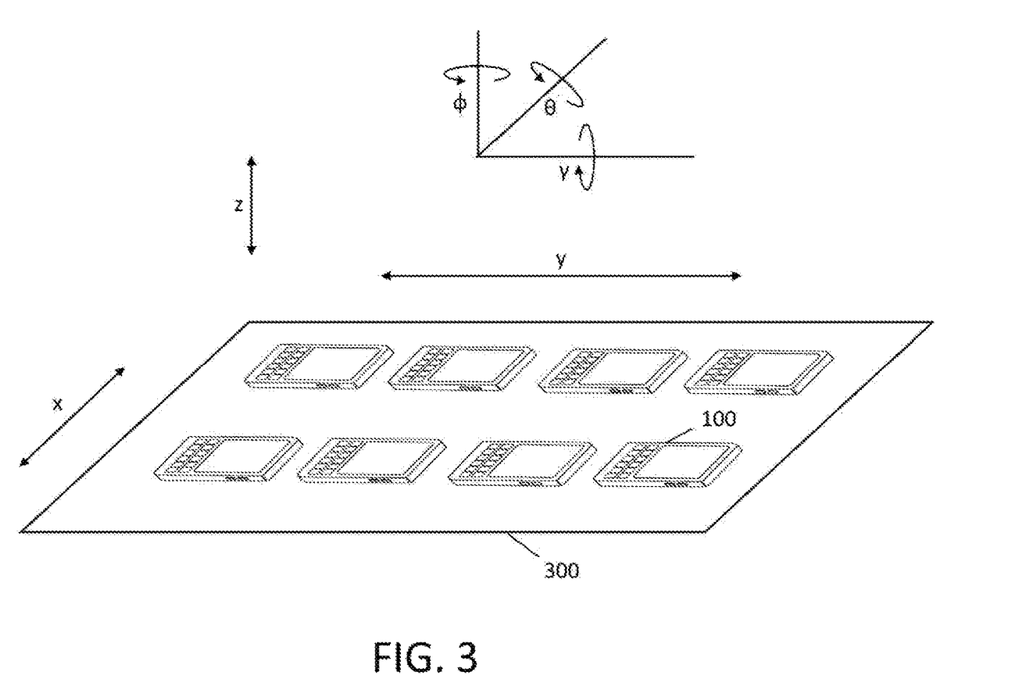
FIG. 3 schematically depicts a test bed for automatically factory calibrating multiple devices, according to an embodiment.

As desired, the calibration operations of this disclosure may be applied simultaneously to multiple devices. For example, FIG. 3 schematically depicts a test bed 300 to which multiple portable devices 100 have been secured. Correspondingly, test bed 300 may be used to impart the automated calibration pattern to each of the portable devices at the same time. For example, for an automated calibration pattern that includes motion, test bed 300 may be moved under machine control to create the desired automated calibration pattern. When calibrating a motion sensor, this may include translational movement along one or more axes, which may be the orthogonal axes x, y and z as indicated, or may be one or more other axes. Alternatively or in addition, an automated calibration pattern may include rotational movement about one or more axes, which may be the angular rotations $\varphi$, $\theta$ and $\gamma$, or others. As noted above, the automated calibration pattern may include multiple types of motion, in various sequences depending on the embodiment. Likewise, test bed 300 may also be exposed to machine-induced environmental conditions as warranted. Depending on the type of sensor being calibrated, such environmental conditions can include magnetic fields, pressure, temperature, ambient light, proximity and others. As will be appreciated, because the multiple devices do not need to be controlled or communicate externally, the techniques of this disclosure represent improved efficiency over conventional approaches. Further, because multiple devices are subjected to the same conditions, greater reproducibility may be achieved.

In one aspect, the reset may be an initial power on action.

In one aspect, performing a check to determine if the integrated sensor has been previously calibrated may include reading calibration data from a memory location of the integrated sensor. The calibration data may be a factory calibration flag.

In one aspect, calibration data may be stored at a memory location of the integrated sensor. The calibration data may include the determined calibration parameter. The stored calibration data may be applied to measurements from the integrated sensor when it is determined the integrated sensor has previously been calibrated.

In one aspect, monitoring for an automated calibration pattern when the integrated sensor has not been previously calibrated may include comparing sensor data of the integrated sensor to a predetermined data pattern. Comparing sensor data of the integrated sensor to the predetermined data pattern may include determining a difference between the sensor data and the predetermined data pattern and determining the calibration parameter when the difference is below a threshold.

In one aspect, monitoring for an automated calibration may include determining a calibration condition accuracy. Determining a calibration condition accuracy may involve determining at least one of a variance of a sensor signal, a ratio between a variance of a sensor signal and a noise level of a sensor signal.

In one aspect, the automated calibration pattern may be an initialization sequence. The sensor processing unit may have a plurality of types of integrated sensor and a selection of which type of sensor will be calibrated may be based at least in part on the initialization sequence. At least one additional calibration pattern may be imparted to the sensor processing unit and a calibration parameter determined for the at least one additional integrated sensor.

In one aspect, at least one validation pattern to the device and confirming the determined calibration parameters based at least in part on the imparted validation pattern.

In one aspect, the automated calibration pattern may be a predetermined motion. The predetermined motion may be at least one of a rotation, a translation and an acceleration.

In one aspect, the automated calibration pattern may be changes in an environmental condition.

In one aspect, the at least one automated calibration pattern is imparted simultaneously to a plurality of sensor processing units.

In one aspect, the sensor processing unit may be integrated into a portable device.

As noted, the sensor being calibrated may be integrated into a sensor processing unit but not yet incorporated into a device when it is calibrated or a sensor that has been incorporated into a device that has been manufactured.

In the described embodiments, a chip is defined to include at least one substrate typically formed from a semiconductor material. A single chip may be formed from multiple substrates, where the substrates are mechanically bonded to preserve the functionality. Multiple chip includes at least 2 substrates, wherein the 2 substrates are electrically connected, but do not require mechanical bonding. A package provides electrical connection between the bond pads on the chip to a metal lead that can be soldered to a PCB. A package typically comprises a substrate and a cover. Integrated Circuit (IC) substrate may refer to a silicon substrate with electrical circuits, typically CMOS circuits. MEMS substrate provides mechanical support for the MEMS structure. The MEMS structural layer is attached to the MEMS substrate. The MEMS substrate is also referred to as handle substrate or handle wafer. In some embodiments, the handle substrate serves as a cap to the MEMS structure. In the described embodiments, an electronic device incorporating a sensor may employ a motion tracking module also referred to as Motion Processing Unit (MPU) that includes at least one sensor in addition to electronic circuits. The sensor, such as a gyroscope, a compass, a magnetometer, an accelerometer, a microphone, a pressure sensor, a proximity sensor, or an ambient light sensor, among others known in the art, are contemplated. Some embodiments include accelerometer, gyroscope, and magnetometer, which each provide a measurement along three axes that are orthogonal relative to each other referred to as a 9-axis device. Other embodiments may not include all the sensors or may provide measurements along one or more axes. The sensors may be formed on a first substrate. Other embodiments may include solid-state sensors or any other type of sensors. The electronic circuits in the MPU receive measurement outputs from the one or more sensors. In some embodiments, the electronic circuits process the sensor data. The electronic circuits may be implemented on a second silicon substrate. The first substrate may be vertically stacked, attached and electrically connected to the second substrate in a single semiconductor chip.

In one embodiment, the first substrate is attached to the second substrate through wafer bonding, as described in commonly owned U.S. Pat. No. 7,104,129, which is incorporated herein by reference in its entirety, to simultaneously provide electrical connections and hermetically seal the MEMS devices. This fabrication technique advantageously enables technology that allows for the design and manufacture of high performance, multi-axis, inertial sensors in a very small and economical package. Integration at the wafer-level minimizes parasitic capacitances, allowing for improved signal-to-noise relative to a discrete solution. Such integration at the wafer-level also enables the incorporation of a rich feature set which minimizes the need for external amplification.

In the described embodiments, raw data refers to measurement outputs from the sensors which are not yet processed. Motion data refers to processed raw data. Processing may include applying a sensor fusion algorithm or applying any other algorithm. In the case of the sensor fusion algorithm, data from one or more sensors are combined to provide an orientation of the device. In the described embodiments, a SPU may include processors, memory, control logic and sensors among structures.

Although the present disclosure has been described in accordance with the embodiments shown, one of ordinary skill in the art will readily recognize that there may be variations to the embodiments and those variations would be within the spirit and scope of the present disclosure.

What is claimed is:

1. A method for automatically calibrating a sensor, the method comprising:
   a) providing a plurality of sensor processing units undergoing manufacture, each having an integrated sensor;
   b) performing a check with each of the sensor processing units to determine if its integrated sensor has been previously calibrated upon a reset;
   c) monitoring for a machine-induced, automated calibration pattern with each sensor processing unit to trigger a calibration process using output from the integrated sensor when the integrated sensor has not been previously calibrated;

d) imparting at least one automated calibration pattern to each sensor processing unit for calibrating its integrated sensor when the integrated sensor has not been previously calibrated;

e) determining a calibration parameter for each integrated sensor based at least in part on the imparted automated calibration pattern when each integrated sensor has not been previously calibrated; and f) applying the determined calibration parameter to each integrated sensor.

2. The method of claim 1, wherein the reset comprises an initial power on action.

3. The method of claim 1, wherein performing a check to determine if the integrated sensor has been previously calibrated comprises reading calibration data from a memory location of the integrated sensor.

4. The method of claim 3, wherein the calibration data comprises a factory calibration flag.

5. The method of claim 1, further comprising storing calibration data at a memory location of the integrated sensor.

6. The method of claim 5, further comprising applying the stored calibration data to measurements from the integrated sensor when it is determined the integrated sensor has previously been calibrated.

7. The method of claim 1, wherein monitoring for an automated calibration pattern when the integrated sensor has not been previously calibrated comprises comparing sensor data of the integrated sensor to a predetermined data pattern.

8. The method of claim 7, wherein comparing sensor data of the integrated sensor to the predetermined data pattern comprises determining a difference between the sensor data and the predetermined data pattern and determining the calibration parameter when the difference is below a threshold.

9. The method of claim 1, wherein monitoring for an automated calibration comprises determining a calibration condition accuracy.

10. The method of claim 9, wherein the determining a calibration condition accuracy comprises determining at least one of a variance of a sensor signal, and a ratio between a variance of a sensor signal and a noise level of a sensor signal.

11. The method of claim 1, wherein the automated calibration pattern comprises an initialization sequence.

12. The method of claim 11, wherein at least one of the sensor processing units comprises a plurality of types of integrated sensor and wherein a selection of which type of sensor will be calibrated is based at least in part on the initialization sequence.

13. The method of claim 12, further comprising imparting at least one additional calibration pattern to the at least one of the sensor processing units and determining a calibration parameter for at least one additional integrated sensor.

14. The method of claim 1, further comprising imparting at least one validation pattern to the at least one of the sensor processing units and confirming the determined calibration parameters based at least in part on the imparted validation pattern.

15. The method of claim 1, wherein the automated calibration pattern comprises a predetermined motion.

16. The method of claim 15, wherein the predetermined motion comprises at least one of a rotation, a translation and an acceleration.

17. The method of claim 1, wherein the automated calibration pattern comprises changes in an environmental condition.

18. The method of claim 1, wherein at least one of the sensor processing units is integrated into a portable device.

19. A portable device comprising:
an integrated sensor; and
a calibration module configured to:
a) perform a check to determine if the integrated sensor has been previously calibrated upon a reset of the portable device;
b) monitor for a machine-induced, automated calibration pattern during manufacture to trigger a calibration process using output from the integrated sensor when the integrated sensor has not been previously calibrated;
c) determine a calibration parameter for the integrated sensor based at least in part on experiencing the automated calibration pattern when the integrated sensor has not been previously calibrated; and
f) apply the determined calibration parameter to the integrated sensor.

20. The portable device of claim 19, wherein the calibration module determines the calibration parameter for the integrated sensor without external communication.

* * * * *